Figure 1:
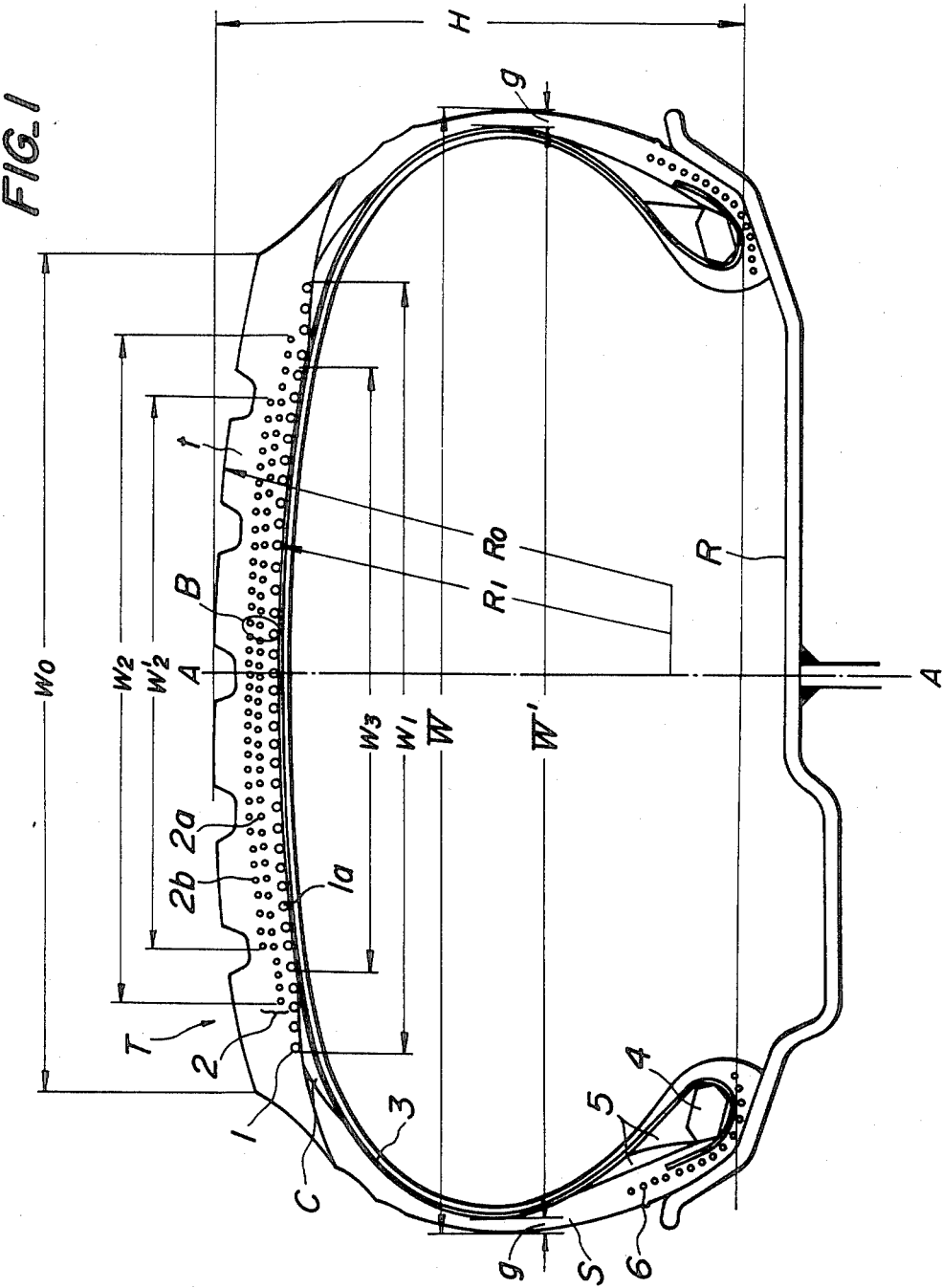

United States Patent [19]

Iwata et al.

[11] Patent Number: 4,702,293

[45] Date of Patent: Oct. 27, 1987

[54] HEAVY-DUTY LOW-SECTION PNEUMATIC RADIAL TIRE

[75] Inventors: Norio Iwata, Amagi; Masao Nakamura, Tokyo; Takashi Takusagawa, Ohme, all of Japan

[73] Assignee: Bridgestone Tire Company Limited, Tokyo, Japan

[21] Appl. No.: 834,123

[22] Filed: Feb. 26, 1986

Related U.S. Application Data

[63] Continuation of Ser. No. 564,046, Dec. 21, 1983, abandoned.

[30] Foreign Application Priority Data

Dec. 29, 1982 [JP] Japan .............................. 57-230059

[51] Int. Cl.$^4$ .......................... B60C 9/18; B60C 9/28
[52] U.S. Cl. .................................... 152/531; 152/454; 152/532; 152/535; 152/536; 152/538
[58] Field of Search ............... 152/538, 532, 527, 531, 152/535, 536, 454, 556, 533, 541

[56] References Cited

U.S. PATENT DOCUMENTS

| | | | |
|---|---|---|---|
| 3,643,723 | 2/1972 | Mukai et al. | 152/536 X |
| 3,786,851 | 1/1974 | Hirtain et al. | 152/361 DM |
| 3,874,436 | 4/1975 | Hashida et al. | 152/361 DM |
| 3,999,585 | 12/1976 | Grawey | 152/361 DM |
| 4,262,726 | 4/1981 | Welter | 152/361 R |
| 4,349,061 | 9/1982 | Hirakawa et al. | 152/532 X |

FOREIGN PATENT DOCUMENTS

| | | | |
|---|---|---|---|
| 52-44902 | 4/1977 | Japan | 152/538 |
| 57-15004 | 1/1982 | Japan | 152/536 |
| 57-70706 | 5/1982 | Japan | 152/532 |
| 1182805 | 3/1970 | United Kingdom . | |
| 1334180 | 10/1973 | United Kingdom . | |

*Primary Examiner*—Donald E. Czaja
*Assistant Examiner*—Ramon R. Hoch
*Attorney, Agent, or Firm*—Sughrue, Mion, Zinn, Macpeak and Seas

[57] ABSTRACT

A heavy duty low-section pneumatic and a process for manufacturing the same are disclosed. This tire comprises a radial carcass toroidally extending between bead portions, a belt composed of a first and second belt layers successively superimposed around a crown portion of the carcass and a tread rubber having substantially the same width as the maximum width of the belt. In the belt, the first belt layer is composed of at least two cord plies each containing cords inclined at a small angle with respect to the equatorial plane of the tire, the cords of which being crossed with each other with respect to the equatorial plane, while the second belt layer is composed of at least one cord ply containing non-expansible or hardly expansible cords arranged in substantially parallel to the equatorial plane and extends over both sides of the first belt layer between the first belt layer and the carcass.

20 Claims, 3 Drawing Figures

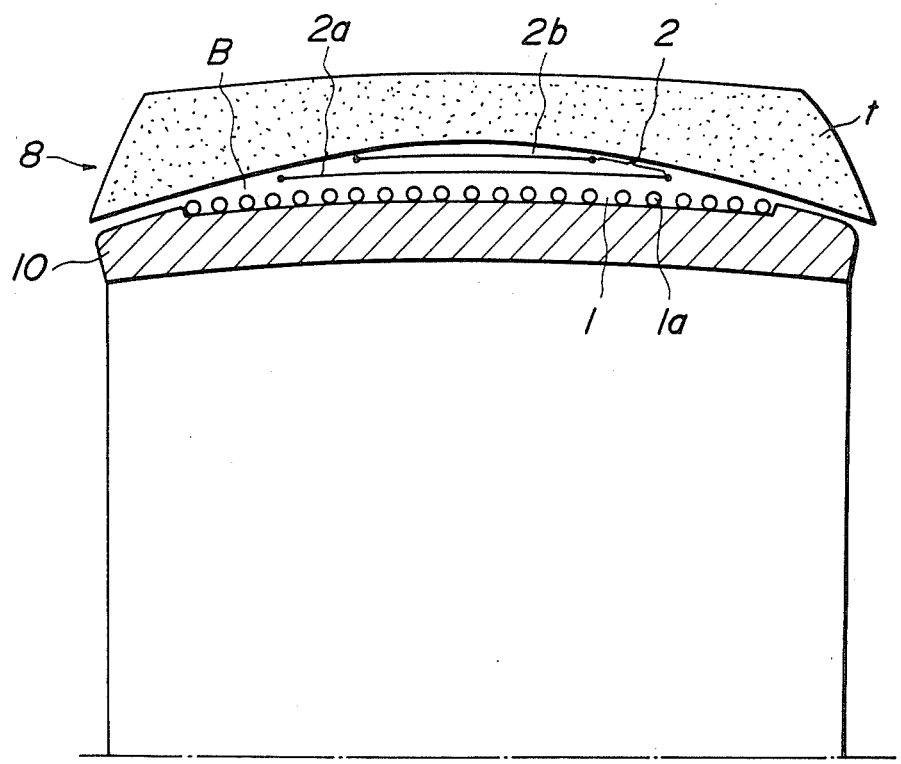

HEAVY-DUTY LOW-SECTION PNEUMATIC RADIAL TIRE

This is a continuation of U.S. Pat. Ser. No. 564,046, filed on Dec. 21, 1983, now abandoned.

This invention relates to a heavy duty low-section pneumatic radial tire and a process for manufacturing the same.

In general, a heavy duty pneumatic radial tire comprises a radial carcass toroidally extending over a pair of annular bead portions, a belt consisting of plural ply layers successively superimposed one upon the other about a crown portion of the carcass, and a tread rubber. The radial carcass, there is employed a single ply or plural piles using a strand cord of steel wire (hereinafter referred to as "steel cord"), or a cord of nylon fiber, polyester fiber, aromatic polyamide fiber [hereinafter referred to as Kevlar (trade name)] or the like. For to the belt, there are several cases, one of which is a first layer composed of an even number of cord plies, usually two cord plies each containing steel cords inclined at a small angle with respect to the equatorial plane of the tire. The cords of which plies are crossed with each other and combined with a second layer of a cord ply containing steel cords inclined at a slightly larger angle with respect to the equatorial plane of the tire disposed between the first layer and the crown portion of the carcass. In another case, the first layer is directly superimposed about the crown portion of the carcass and one or several of relatively expansible cords such as nylon cords are spirally wound around the first layer substantially parallel to the equatorial plane of the tire and between the first layer and the tread rubber. Alternatively, a tire cord fabric of nylon cords having the same spiral inclination angle as described above is piled onto the first layer.

Such a belt structure is suitably applied to the conventional tires having an aspect ratio of about 1.0. But, if it is intended to apply the above belt structure to heavy duty low-section pneumatic radial tires having an aspect ratio of not more than 0.8, particularly about 0.4, the rigidity of the belt remarkably lowers at the both sides, so that the expected tread shape cannot be ensured.

That is, since the tire of this type is usually inflated at a high internal pressure of about 8 kg/cm², the tenacity-bearing of the belt having a transversally spread shape becomes larger at its both sides than at the central portion. Consequently, the tread is transformed into a concave shape, whose footprint is oblong shape having an axis in the widthwise direction of the tread, so that the uneven wear is apt to be caused and the wet skid resistance lowers disadvantageously.

It is, therefore, an object of the invention to effectively solve the problems inherent to the conventional heavy duty low-section pneumatic radial tire and to provide an advantageous process for manufacturing a heavy duty low-section pneumatic radial tire of this type without suffering the disadvantages inherent to the conventional tire as described above.

According to the invention, there is a provision of a heavy duty low-section pneumatic radial tire comprising a radial carcass toroidally extending between a pair of annular bead portions, a belt composed of plural ply layers successively superimposed one upon the other around a crown portion of the carcass, and a tread rubber having substantially the same width as the maximum width of the belt; said belt being a combination of a first belt layer with a second belt layer, said first belt layer being composed of at least two cord plies each containing cords inclined at a small angle with respect to the equatorial plane of the tire, the cords of which plies being crossed with each other with respect to the equatorial plane, said second belt layer being composed of at least one cord ply containing non-expansible or hardly expansible cords arranged in substantially parallel to the equatorial plane and extending over both sides of the first belt layer between the carcass and the first belt layer.

In the preferred embodiments of the invention, the radial carcass is composed of a single to several plies of the fiber cords each made of nylon fiber, polyester fiber or preferably Kevlar fiber, or of a single or two plies at the most of the steel cords. Further, the first belt layer uses the above fiber cords or steel cords arranged at an inclination angle of 10°–40° with respect to the equatorial plane of the tire, while the second belt layer uses cords having a modulus of elasticity of not less than $30 \times 10^4$ kg/cm² and extends over a width wider than that of the first belt layer and at substantially the same width as that of the tread rubber. And also, the second belt layer is arranged on the carcass such that at least 50%, preferably 60–80% of the second belt layer at its central portion is located along the cord pass line at the crown portion of the carcass, while the remaining both side portions of the second belt layer are disposed on cushion rubbers each located at the shoulder portion of the carcass. Moreover, the second belt layer has a bearing ratio on resistance to tensile load of 60–90% of the sum of the resistances to tensile load of the first and second belt layers per unit width calculated by the following formula:

$$T \cdot N \cos \alpha^2 / R_m \cdot P$$

wherein, T is a tenacity of a cord, N is an end count of cords per unit width as measured at right angle to the cord, $\alpha$ is an inclination angle of the cord with respect to the equatorial plane of the tire, $R_m$ is a radius of each cord ply being a distance the cord center and the tire center and P is a normal internal pressure of the tire. In the tire according to the invention, it is preferable that the aspect ratio H/W is within a range of 0.9–0.4, preferably 0.7–0.4 and the carcass flatness $R_1/W'$ is within a range of 3–10, preferably 5–10.

The heavy duty low-section pneumatic radial tire according to the invention may advantageously be manufactured by a process comprising the steps of:

forming a first green case in which a ply(s) for carcass is placed on an outer circumference of a first drum and turned around each of bead cores so as to sandwich a stiffener above the bead core between the ply and the turnup portion thereof and then a sidewall rubber layer is applied thereto;

forming a second green case in which one or plural non-expansible or hardly expansible cords are spirally wound on a second drum with an outer profile substantially corresponding to the carcass form when the tire to be manufactured is mounted on a rim and inflated at a given internal pressure and being capable of contracting the above profile to form a second belt layer for belt and then a first belt layer for belt and a tread rubber layer are successively piled thereon;

forming a green tire casing in which the first green case taken out from the first drum is inserted into the inside of the second green case taken out from the second drum in alignment with each other and then the resulting assembly is brought to a toroidal shape;

and placing the green tire casing in a vulcanizer to conduct the curing thereof. In this case, it is particularly convenient to extrude each of the sidewall rubber layers together with a cushion rubber to be located at its one end.

In the conventional heavy duty low-section pneumatic radial tires, the aforementioned first belt layer or at least two cord plies each containing steel cords, in many cases, inclined at a relatively small angle of 10°–40° with respect to the equatorial plane of the tire, the cords of which being crossed with each other, are used as a main reinforcement of the belt, so that the rigidity of the belt becomes considerably insufficient in its both side portions as compared with the central portion in case of a lower aspect ratio, and consequently the tread is brought to a concave shape. For this reason, there have been proposed the improvements of the reinforcement characteristics satisfying the requirements for the hoop effect of the belt and the rigidity of the tread, for instance, the adjustments of the cord angle, the ply number and the like, but they cannot yet solve the above problems. With the foregoing in mind, the inventors have made a drastic change of the underlying concepts and particularly examined whether or not it is proper to design the first belt layer as the main reinforcement layer for the belt. As a result, the inventors have found that the rigidity of the tread can advantageously be assured by the second belt layer having the structure as defined above while the first belt layer is employed as an auxiliary layer for the belt, whereby a desirable distribution of the ground contact pressure is uniformly produced at the ground contact area in the width direction thereof. Also, the wet skid resistance can be greatly improved without causing uneven wear even when the aspect ratio is as small as 0.4.

Figure 2:
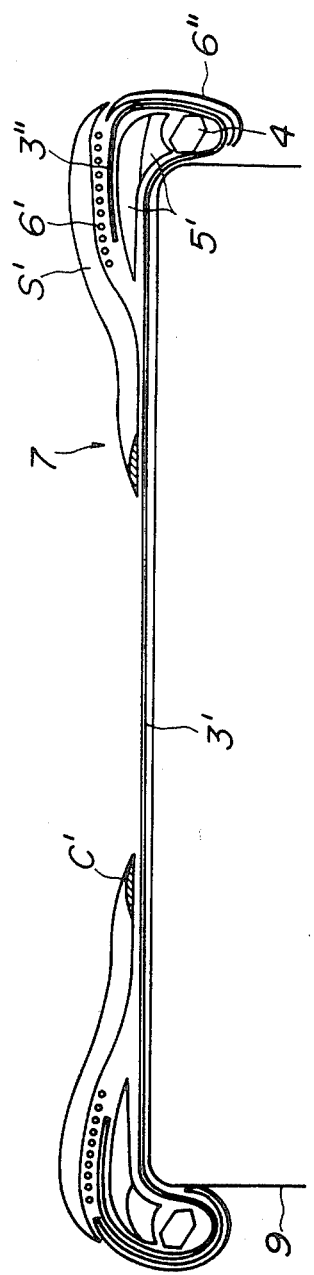

The invention will now be described with reference to the accompanying drawings, wherein:

FIG. 1 is a sectional view of an embodiment of the tire according to the invention; and FIGS. 2 and 3 are schematic views illustrating the main stages in the manufacture of the tire according to the invention, respectively.

In FIG. 1 is shown an embodiment of the heavy duty low-section pneumatic radial tire according to the invention having a tire size of 380/50 R 17.5 14P at such a state that the tire T is mounted onto a rim R of 12.25×17.5 and inflated under an internal pressure of 8.5 kg/cm².

Reference numeral 1 is a second belt layer for a belt B. In the illustrated embodiment, the second belt layer 1 is a cord ply containing steel cords $1a$ (strand construction: $1 \times 3 + 9 \times 15 \times 0.25 + 1$) arranged at an end count of 6 cords/cm over a width $w_1$ substantially equal to a tread width $w_0$ and substantially parallel to the equatorial plane of the tire. Reference numeral 2 is a first belt layer, which is composed of two cord plies containing steel cords $2a$ and $2b$ (strand construction: $1 \times 3 + 6 \times 0.38$ mm) arranged at an inclination angle of 20° with respect to the equatorial plane of the tire and extending at an end count of 5.5 cords/cm over widths $w_2$ and $w_2'$ slightly narrower than that of the second layer, the cords of which plies being crossed with each other.

Reference numeral 3 is a radial carcass composed of a cord ply containing steel cords (strand construction: $1 \times 3 + 9 \times 0.25 + 1$, and count: 6 cords/cm), which extends between a pair of annular bead portions, and is turned up around a bead core 4 embedded in the bead portion so as to sandwich a stiffers 5 (composed of two hard and soft rubber stocks in the illustrated embodiment) between the carcass and the turnup portion thereof, and is reinforced at the outside of the turnup portion with a chafer 6 of steel cords (strand construction: $1 \times 3 + 9 + 15 \times 0.15 + 1$, and count: 26 cords/25.4 mm) inclined at an angle of 60° with respect to the radial line of the tire.

A tread rubber t is piled onto the belt B consisting of the first belt layer 2 and the second belt layer 1, and united at both side regions of the second belt layer 1 with a cushion rubber C interposed between the second belt layer 1 and the radial carcass 3 and a side rubber S.

In the illustrated embodiment, the tire T has the following dimensions of $W=380$ mm, $w_0=285$ mm, $w_1=280$ mm, $w_2$:210 mm, $w_2'=140$ mm and $w_3=195$ mm corresponding to a distance between the opposed ends of the cushion rubbers C, in which the second belt layer 1 extends at its central portion over the distance $w_3$ along the cord pass line of the radial carcass 3 in direct contact therewith and each of the remaining side portions is located on the cushion rubber C. The height H of the tire as measured from the bead base of the bead portion is 185 mm, thus the aspect ratio expressed by H/W being about 50%. On the other hand, as the radius $R_0$ of the tread crown is 2,500 mm and the radius $R_1$ of the crown portion of the carcass 3 contacting with the first belt layer 2 is 2,465 mm, the carcass flatness expressed by the ratio of the radius of the crown portion of the carcass to the maximum carcass width ($W'=W-2g$) (g is a thickness of the sidewall rubber at the position of the maximum width. In the illustrated embodiment, g is 4 mm.) is 6.6.

When the tenacity T per one cord of the first belt layer 2 in the vicinity of the equatorial plane of the tire is 320 kg and the radius Rm of the cord ply of the belt is 38 cm and the internal pressure P is 8.5 kg/cm², the resistance to tensile load per unit width is 5.9 as calculated from the aforementioned equation, while the tenacity T of the second belt layer 1 is 185 kg and hence the resistance to tensile load thereof is 2.8. Accordingly, the bearing ratio of the first belt layer 2 in the sum of these resistances to tensile load is $$\frac{5.9}{5.9 + 2.8} \times 100 \cong 68\%.$$

In order to obtain a more uniform ground contact pressure, it is desirable that the resistance to tensile load of the first belt layer 2 is larger at both side edge portions than at the central portion corresponding to the crown portion of the carcass 3 as the aspect ratio becomes particularly smaller. Accordingly, a reinforcing layer of cords, preferably fiber cords arranged at an inclination angle of not less than 60° with respect to the equatorial plane of the tire may be applied to the each side edge portion of the first belt layer 2 though such an application is disadvantageous in view of the tire manufacture as mentioned later.

In the belt B, the width $w_1$ of the second belt layer 1 is desirable to be 90–110%, preferably 95–105% with respect to the width $w_0$ of the tread from the standpoint of the belt durability. The width $w_3$ of the second belt layer lying along the cord pass line in the crown portion of the carcass 3 is desirable to be within a range of 50-90%, preferably 60-80% with respect to the above width $w_1$ from the standpoint of uniformity of the ground contact pressure at the rotation of the tire under a load as well as the belt durability.

In order to prevent possible end separation at the side edge portions of the first belt layer 2, the width $w_2$ of the first belt layer 2 in the belt B is in a range of 60-80%, preferably 70-80% with respect to the above width $w_1$.

As previously mentioned, the first and second belt layers of the belt B may optionally take a proper combination of various cord materials, but in the heavy duty low-section pneumatic radial tires of this type, the belt layers including the carcass ply are preferable to be composed of steel cords as in the illustrated embodiment.

Moreover, the second belt layer 1 of the belt B may be the single ply as in the illustrated embodiment or may be composed of plural plies. In the latter case, at least one cord ply is continuous in the width direction, while the remaining ply or plies may be properly divided in the width direction into plural bands.

Preferably, the radius $R_0$ of curvature of the tread t is made substantially equal to $R_1$ of the crown portion of the carcass 3.

Thus, the invention is applicable to tires wherein the aspect ratio H/W is in a range of 0.4-0.9, particularly 0.4-0.65 and the internal pressure is within a range of not more than 1.4 times, preferably not more than 1.25 times the normal internal pressure.

The performances of the tire A of the invention illustrated in FIG. 1 and explained above were compared with those of the conventional tires having the following belt reinforcement.

Conventional tire B:

This tire had the conventional belt structure that onto the crown portion of the carcass 3 as shown in FIG. 1 were successively superimposed a first layer of steel cords arranged inclined at 65° with respect to the equatorial plane of the tire, a second layer of steel cords inclined at 15° in the same direction as that of the first layer and having a width wider than in that of the first layer, and a third layer of steel cords inclined at 15° in the direction opposite to that of the first layer and having a width relatively narrower than that of the second layer, all of these steel cords having the strand construction of $1\times3+9+15\times0.25+1$.

Conventional tire C:

This tire has the conventional belt structure that two layers of steel cords each having the strand construction of $1\times3+6\times0.38$ were arranged on the crown portion at the same cord angles as those of the second and third layers of the tire B and a steel cord of $1\times3+9+15\times0.25+1$ was spirally wound therearound in parallel to the equatorial plane of the tire.

The items, conditions and results of the comparison test are shown in the following Table.

| Item | Test method | Tire A | Tire B | Tire C |
| --- | --- | --- | --- | --- |
| Belt end separation | The length of crack produced at the end of the belt was measured after the tire subjected to an internal pressure of 8.5 kgw/cm² was run at a speed of 65 km/h under a load of 4,000 kgw corresponding to a 140% overload over a distance of 3,000 km. | 140 | 100 | 130 |
| Distribution of ground contact pressure in widthwise direction | The ground contact pressure of the tire was measured at positions of crown center: ¼ point in widthwise direction of tread: shoulder after the tire was inflated to an internal pressure of 8.5 kgw/cm² under a load of 2,880 kgw corresponding to a 100% normal load. | 1:1:1 | 1:0.7:1.2 | 1:1:1 |
| Uneven wear resistance (good road) | The difference of wear depth between adjacent ribs was measured after the tire subjected to an internal pressure of 8.5 kgw/cm² was run under a load of 2,500 kgw over a distance of 25,000 km. | 0.2 mm | 2.0 mm | 1.8 mm |
| Belt weight | Total weight of the belt in one tire. | 60 | 100 | 60 |
| Belt damage (bad road) | The cord breaking of the spirally wound cord layer in the belt was observed after the tire subjected to an internal pressure of 8.5 kgw/cm² was run under a load of 2,500 kgw over a distance of 50,000 km. | none | | Cord breaking occurred at 54 portions |

As seen from the above results, in the tire according to the invention, uneven wear is considerably reduced by improving the belt reinforcing structure as mentioned above to make the distribution of ground contact pressure in the widthwise direction appropriate, and also the reduction of belt weight and the improving effect for preventing the belt separation and cord breaking are conspicuous.

FIGS. 2 and 3 schematically illustrate an advantageous process for manufacturing the tire according to the invention referring to the stages for the formation of a first green case 7 and a second green case 8.

In the manufacture of the first green case 7 with reference to FIG. 2, a ply material(s) 3' for the carcass 3 is first wound around an outer circumference of a first drum 9 with a collapsible cylindrical shape according to the conventional manner, and thereafter both surplus portions 3" of the ply material 3' are turned around bead cores 4 located at both sides of the drum to sandwich two soft and hard rubber stocks 5' constituting the stiffener rubber 5, and then a pair of rubber materials S' each constituting the sidewall rubber layer S are laminated to a part of the ply material 3' and its both turnup portions through necessary wire chafer materials 6' and rubber chafers materials 6". Next, the outer diameter of the first drum 9 is reduced to take out the first green case 7 from the drum.

In this case, it is desirable that the rubber material S' is simultaneously extruded as a composite material together with a rubber stock C' corresponding to the cushion rubber C to be located inward thereof. The rubber stock C' has preferably the rubber properties similar to those of a coating rubber for the carcass 3 and belt as mentioned later.

In the manufacture of the second green case 8 as shown in FIG. 3, single steel cord 1a or a bundle of two or at most three steel cords 1a constituting the second belt layer 1 is first wound on an outer circumference of a second drum 10 with a collapsible cylindrical shape in a spiral profile alighted with the cord pass line in the crown portion of the carcass 3 of the tire to be manufactured under a predetermined internal pressure. Although not shown, this winding may be performed in two or more layers if necessary. Alternatively, a bias cord fabric composed of these cords may be turned around the drum with its ends overlapped with each other in the orientation direction of the cords.

With respect to the first belt layer 2, the cords 2a and 2b are crossed with each other in the same cord arrangement as that of the conventional main belt reinforcement and piled in two piles as shown in FIG. 3 or in a number of piles near two. Therefore, a tread rubber t is piled on the first belt layer 2.

Then, the thus formed second green case 8 is taken out by reducing the outer diameter of the second drum 10, into the inside of which is inserted the first green case 7 in alignment with each other. The resulting assembly is toroidally transformed to form a green tire casing, which is cured in a vulcanizer in the conventional manner, whereby the radial tire as shown in FIG. 1 can easily be obtained.

According to the invention, not only the uniform distribution of the ground contact pressure is heavy duty low-section pneumatic radial tires having an aspect ratio of up to 0.4 can be advantageously realized by improving the belt reinforcement structure, but also the weight-saving of the tire together with the prevention of uneven wear of the tread can be obtained by reducing the belt weight without producing the belt end separation and cord breaking. Further, the invention particularly facilitates the manufacture of such heavy duty low-section pneumatic radial tires.

What is claimed is:

1. A heavy duty low-section open tube type pneumatic radial tire comprising; a radial carcass toroidally extending between a pair of annular bead portions, said bead portions having a bead core and a stiffener, a belt composed of plural ply layers successively superimposed one upon the other around a crown portion of the carcass, and a tread rubber; said belt comprising a first belt layer and a second belt layer, said first belt layer composed of at least two cord plies each containing cords inclined at a small angle with respect to the equatorial plane of the tire, the cords of said plies being crossed with each other with respect to the equatorial plane, said second belt layer composed of at least one cord ply containing at least substantially non-expansible cords arranged substantially parallel to the equatorial plane and extending laterally beyond both sides of said first belt layer between the first belt layer and the carcass and having the same width as said tread rubber, and said first and second belt layers having no intermediate cushion layer therebetween.

2. The heavy duty low-section pneumatic radial tire according to claim 1, wherein said radial carcass is composed of a single to several plies of cords selected from the group consisting of non-expansible or hardly expansible aromatic polyamide cords and steel cords.

3. The heavy duty low-section pneumatic radial tire according to claim 1, wherein said first belt layer is composed of fiber cords of a material selected from the group consisting of nylon, polyester and aromatic polyamide, said cords being arranged at an inclination angle of 10°–40° with respect to the equatorial plane of the tire.

4. The heavy duty low-section pneumatic radial tire according to claim 1, wherein said first belt layer is composed of strand cords of steel wires arranged at an inclination angle of 10°–40° with respect to the equatorial plane of the tire.

5. The heavy duty low-section pneumatic radial tire according to claim 1, wherein said second belt layer is composed of cords having a modulus of elasticity of not less than $30 \times 10^4$ kg/cm$^2$.

6. The heavy duty low-section pneumatic radial tire according to claim 1, wherein said second belt layer is arranged on the carcass such that at least 50% of the second belt layer at its central portion is located along the cord pass line at the crown portion of the carcass in direct contact therewith, while the remaining both side portions are disposed on cushion rubbers each located at the shoulder portions of the carcass.

7. The heavy duty low-section pneumatic radial tire according to claim 1, wherein said second belt layer has a bearing ratio on resistance to tensile load of 60–90% of the sum of the resistances to tensile load of said first and second belt layers per unit width calculated by the equation:

$$T \cdot N \cos \alpha^2 / Rm \cdot P$$

, wherein T is a tenacity of a cord, N is an end count of cords per unit width as measured at right angle to the cord, $\alpha$ is an inclination angle of the cord with respect to the equatorial plane of the tire Rm is a radius of each cord ply being a distance between the cord center and the tire center and P is a normal internal pressure of the tire.

8. The heavy duty low-section pneumatic radial tire according to claim 1, wherein said tire has an aspect ratio H/W of 0.9–0.4, and a carcass flatness $R_1/W'$ of 3–10.

9. The heavy duty low-section pneumatic radial tire according to claim 1, wherein to each of both side edge portions of said second belt layer is applied a reinforcing layer of fiber cords arranged at an inclination angle of not less than 60° with respect to the equatorial plane of the tire.

10. The heavy duty low-section pneumatic radial tire according to claim 1, wherein said second belt layer has a width ($w_1$) corresponding to 90–110% of the tread width ($w_0$).

11. The heavy duty low-section pneumatic radial tire according to claim 1, wherein said second belt layer lies along the cord pass line in the crown portion of the carcass over a width corresponding to 50–90% of the width ($w_1$) of the second belt layer.

12. The heavy duty low-section pneumatic radial tire according to claim 1, wherein said first belt layer has a width ($w_2$) corresponding to 60–80% of the width ($w_1$) of the second belt layer.

13. The heavy duty low-section pneumatic radial tire according to claim 1, wherein all cords used in said carcass and belts are steel cords.

14. The heavy duty low-section pneumatic radial tire according to claim 1, wherein said first belt layer is composed of two plies and said second belt layer is composed of a single ply.

15. The heavy duty low-section pneumatic radial tire according to claim 14 wherein the widths of said plies constituting said first belt layer become narrower outward in the radial direction of the tire.

16. The heavy duty low-section pneumatic radial tire according to claim 1, wherein said second belt layer is composed of plural plies, at least one ply of which being continuous in the widthwise direction and the remaining plies of which being divided in the widthwise direction.

17. The heavy duty low-section pneumatic radial tire according to claim 1, wherein said tread has a radius of curvature ($R_0$) substantially equal to that ($R_1$) of the crown portion of the carcass.

18. The heavy duty low-section pneumatic radial tire according to claim 1, wherein an internal pressure is higher by not more than 1.4 times, preferably not more than 1.25 times than normal internal pressure.

19. The heavy duty low-section pneumatic radial tire according to claim 1, wherein said second belt layer is arranged on the carcass such that 60–80% of the second belt layer at its central portion is located along the cord pass line at the crown portion of the carcass in direct contact therewith, while the remaining both side portions are disposed on cushion rubbers each located at the shoulder portions of the carcass.

20. The heavy duty low-section pneumatic radial tire according to claim 1, wherein said tire has an aspect ratio H/W of 0.7–0.4 and a carcass flatness $R_1/W'$ of 5–10.

* * * * *